United States Patent Office 3,515,711
Patented June 2, 1970

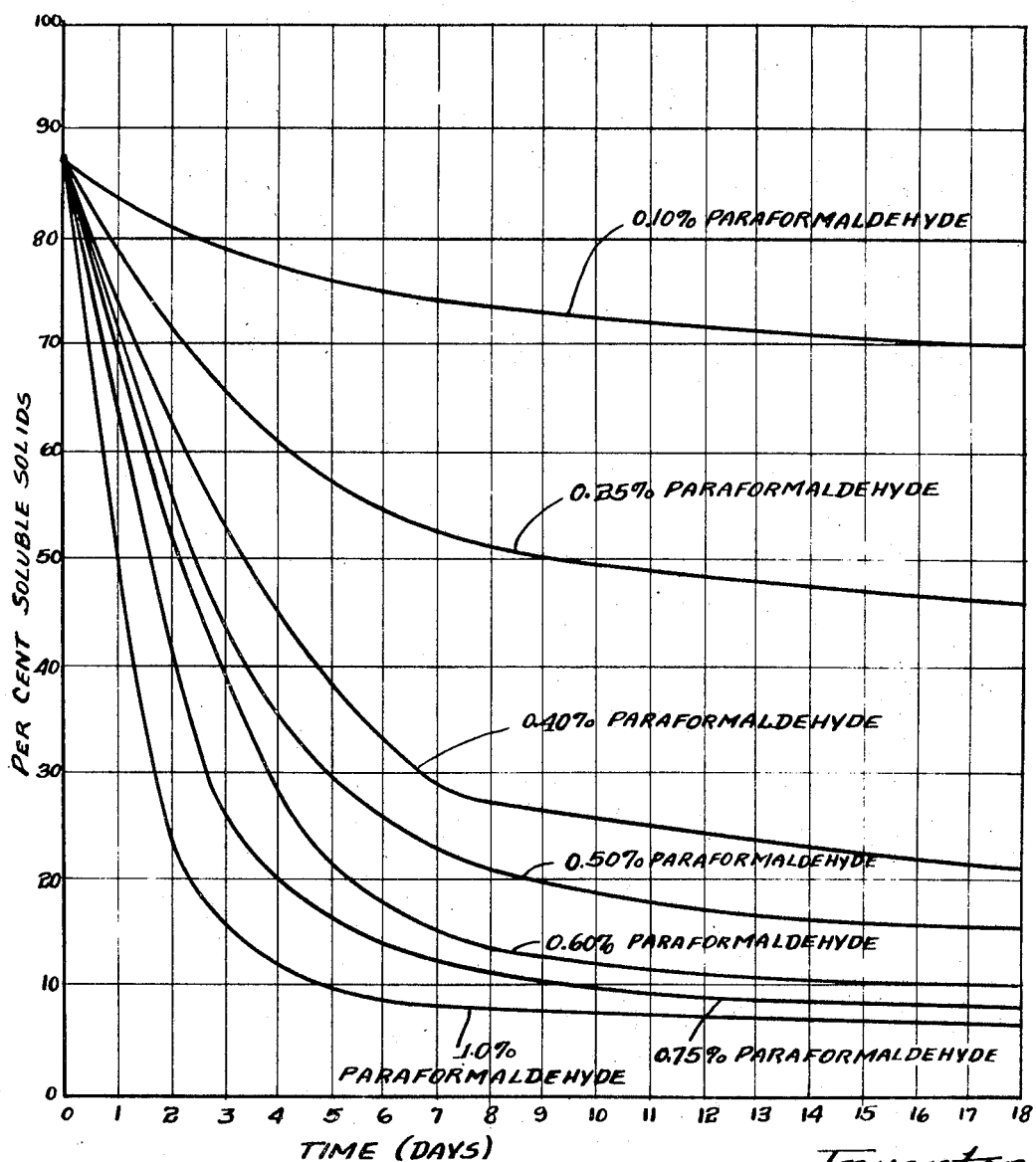

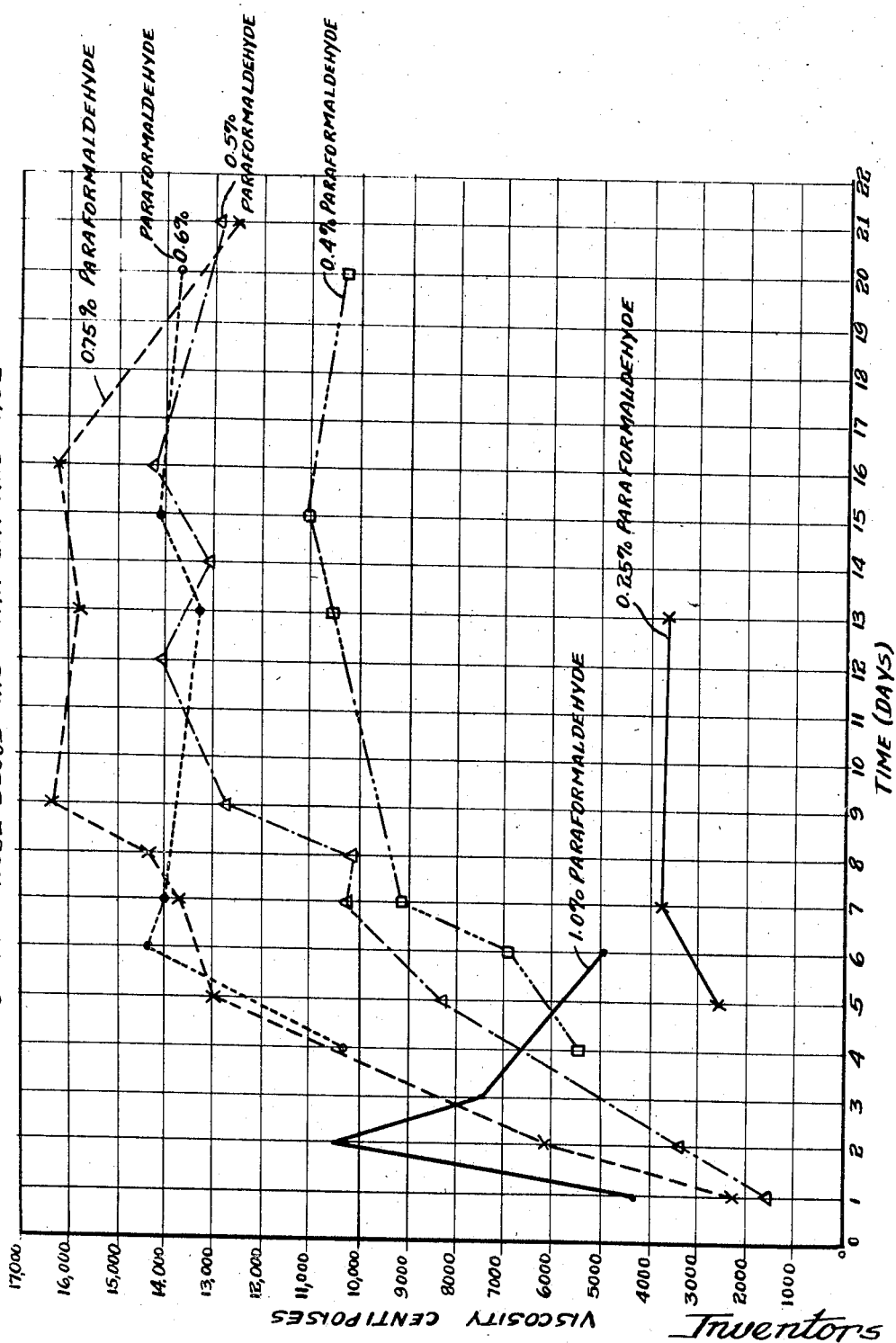

3,515,711
PROTEINACEOUS CONSTITUENT FOR GLUE CONSISTING OF THE REACTION PRODUCT OF POWDERED BLOOD AND FORMALDEHYDE VAPOR IN THE DRY STATE
John P. Richards, La Grange, and Peter L. Shanta, Park Ridge, Ill., assignors to Armour and Company, Chicago, Ill., a corporation of Delaware
Continuation-in-part of application Ser. No. 484,850, Sept. 3, 1965. This application Nov. 28, 1966, Ser. No. 601,820
Int. Cl. C08h 1/02, 7/00
U.S. Cl. 260—112    16 Claims

ABSTRACT OF THE DISCLOSURE

A dry powder suitable for mixing with an alkaline solution to produce a adhesive is made by reacting, in the dry state, formaldehyde vapor and a dry, particulate proteinaceous substance such as powdered blood, casein or soybean protein.

---

This application is a continuation-in-part of our copending application Ser. No. 484,850, filed Sept. 3, 1965, now abandoned.

This invention relates generally to the art of adhesive manufacture and more particularly to protein glues of a type suitable for use in the production of wood laminates.

In one specific aspect, the present invention relates to a powdered blood product having both a controlled, lower solubility in water and a propensity for formulation into an adhesive that is eminently useful in manufacturing plywood.

The first commercial interest in water-resistant glue focused on use of a water-soluble form of animal blood. Resistance to the action of either hot or cold water was achieved by heat-coagulating the blood proteins after the glue product had been applied. Hot presses were commonly employed for veneer panels and drying chambers for clamped joints. Addition of formaldehyde to the aqueous glue mixture was proposed in an effort to achieve total insolubilization of the protein with less dependency on heat. However, the viscosity and handling characteristics of these early products left much to be desired. It now appears that dried animal blood of at least three ranges of total water solubility are suitable for formulating into water-resistant adhesives. These suitable ranges are: Type I, having over 90% total water solubility; Type II, ranging from 70% to 90% total water solubility; and Type VI, ranging from 7% up to 25% total water solubility. More recently, water-resistant adhesives of improved viscosity and consistency have been developed using a dry blood product of comparatively lower solubility in water. These latter products have resulted from mixing soluble blood particles with a filler, and then heating the mixture to denature the surface protein of each particle. While the blood glue base thus produced has proved useful, the presence of the filler is not always desirable and care must be exercised in the heating procedure in order to avoid excessive denaturation of the blood protein and resultant adverse effects on the viscosity of the glue made from it. Further it is difficult to control the degree of water-insolubility of the dried blood glue base.

Therefore, an important object of the present invention is to provide a substantially undiluted powdered blood product of lower solubility in water.

Another object of the invention is to provide a method of making such a product in which the degree of water-insolubility is easily controlled.

Still another object of the invention is to provide a method of making a dry blood product of lower water solubility at ordinary room temperature.

A further broad object of the invention is to provide a new and improved proteinaceous constituent for glues.

A yet further object of the invention is to provide such a product that is stable upon storage.

And a yet further object of the invention is to provide such a product that is readily formulated into glues of superior consistency and viscosity.

These and other objects and features of the invention will become more apparent from a consideration of the following descriptions.

The objects of the invention are achieved by reacting formaldehyde vapor and a dry, particulate material comprising a simple protein such as for example highly or partially water-soluble, powdered whole blood.

More specifically, the particulate proteinaceous material is mixed with a powdered source of formaldehyde vapors, such as paraformaldehyde crystals, whereupon the resultant mixture is allowed to age in order to permit some denaturation to take place. The product of this reaction has been used to manufacture adhesives of optimum viscosity and highly desirable handling characteristics, and these latter properties of the formulated adhesive are easily controlled by judicious selection of the amount of paraformaldehyde or other source of formaldehyde vapor, that is reacted with a given amount of the proteinaceous material. Dried animal blood of almost any particular water solubility can be converted to a blood product of any particular lower solubility by adjusting the paraformaldehyde content. For example, Type I blood can be converted to Type VI blood by the employment of about 0.10% to about 1.0% paraformaldehyde. Type I blood can be converted to a Type II blood using an amount of paraformaldehyde of much lower magnitude, being as low as about 0.01% to about 0.03%; and further 86% total water soluble dried blood (Type II) can be quickly and easily converted to an improved Type II blood product by the use of about 0.015% to about 0.020% paraformaldehyde. Furthermore, the product resulting from reacting formaldehyde vapor and the dry, particulate proteinaceous material is undiluted by inert fillers or the like.

Various terminology is used herein with certain specific meaning. The term "simple protein" is employed to refer to naturally occurring proteins yielding only alpha-amino acids on hydrolysis, such as for example albumins, globulins, prolamines, glutelins and histones. In addition, the term "room temperature" is used to mean the normal, summer daytime temperatures experienced in the middle latitudes, i.e. temperatures in the range of from about 65° F. to about 85° F. Also, the terms "dried soluble blood" and "powdered whole blood" are used synonymously to mean the commercial product which is prepared by drying fresh animal blood without coagulating it. This distinguishes from the commercial product known as "insoluble blood" or "fertilizer blood," a product which is totally insolubilized with respect to water by means of heat or other treatment. This latter product is neither dispersible nor soluble in water and, as the name implies, is frequently used as agricultural fertilizer or as feed.

In the drawings:

FIG. 1 is a graph showing the reaction rates of various mixtures of powdered whole blood and paraformaldehyde as determined by changes in the content of soluble solids; and FIG. 2 is a graph showing the viscosity of certain adhesive products made from variously aged mixtures of powdered whole blood and paraformaldehyde.

The proteinaceous product of the invention is characterized by its controlled, lower solubility in water and by its propensity for formulation into adhesives of superior properties; and while the descriptions given herein emphasize the use of the product of the invention as a constituent of glue, it is to be understood that the fields of use are not strictly limited thereto.

The starting materials for making the product of the invention are a dry, particulate material comprising a simple protein and a denaturant therefor. The dry, particulate, proteinaceous starting material can be derived from various sources. The dried soluble animal blood which constitutes a by-product from the operation of abattoirs has proved to be particularly useful. The comparatively high content of albumins in blood renders the dried soluble form of special utility for the invention, and there appear to be no significant differences in the product of the invention resulting from differences in the source of blood, whether it be cattle, swine, sheep or poultry. Powdered casein, while very sparingly soluble in water, may also be used as a starting material in making the proteinaceous product of the invention. Other suitable materials include powdered gelatin, powdered bone or hide glue, soybean meal from which the oil has been expressed and zein. All of the foregoing materials are available in dry, particulate form and comprise a simple protein. Zein, for example, is a prolamine that is extracted from gluten meal; and soybean meal contains two globulins, glycerin and phaseoline, and two albumins, legumelin and soy legumelin.

For facility in combining it with the particulate proteinaceous starting material, the denaturant is desirably a gas containing a source of reactive methanol groups. Formaldehyde, being a gas at ordinary temperatures and pressures, is especially useful; and polymerized forms of formaldehyde, such as paraformaldehyde, are preferred because they are dry, crystalline products which may be readily mixed with the proteinaceous starting material to liberate formaldehyde vapor as the active denaturant. While hexamethylenetetramine is a crystalline product which can be vaporized and partially decomposed to yield formaldehyde, the sublimation of this substance takes place at an inconveniently high temperature of about 263° F. Hexamethylenetetramine is therefore not of particular suitability for use in the practice of the invention.

The amount of the denaturant which is required is advantageously small. When paraformaldehyde crystals are mixed with powdered whole blood, for example, incorporation of about 0.01% to about 0.75% paraformaldehyde on a weight basis results in a product that is highly satisfactory as a glue constituent. With powdered whole blood a generally preferred level of incorporation to result in a Type VI blood glue base is from about 0.35% to 0.45%. To produce a Type II blood glue base of about 80% solubility, about 0.015% to 0.025% is preferred. The addition of over 1.0% usually produces a product unsatisfactory for adhesive manufacture. In the case of a Type VI blood intended as a glue constituent and based on powdered whole blood, a water solubility of from about 5% to about 25%, and preferably about 6% to about 10% is desired; and the aforementioned amounts of paraformaldehyde crystals are capable of producing such a product. In the case of a Type II blood, intended as a glue constituent and based on powdered whole blood, a water solubility of from about 70% to about 90% and preferably about 75% to about 85% is desired; and the aforementioned amounts are capable of producing such a product. However, different lots of soluble dried blood result in end products of slightly different water-solubility due, it is theorized, to the individual differences in the physiology of the animals whose blood makes up the different lots. It has been observed, for example, that powdered whole blood having an initially lower than average water-solubility produced a glue that was apparently softer and generally less granular than glues formulated from powdered whole blood of more nearly average initial water-solubility.

The proteinaceous product of the invention is made by exposing the particulate, proteinaceous starting material to an atmosphere of the denaturant for a sufficient time to produce a dry material having the desired, lower water-solubility. The reaction takes place at a room temperature with acceptable rapidity, although a more rapid reaction may be promoted by slight heating, for example to about the temperature at which a powdered whole blood is discharged from a spray dryer (about 120° F. to about 140° F.). In the case of mixtures of powdered whole blood and paraformaldehyde, the combined ingredients are merely stored until the reaction of the denaturant and the proteinaceous starting material has substantially subsided as indicated by leveling off of the decline in the percentage water-solubility of the reaction product. When about 0.5% to about 0.6% paraformaldehyde is incorporated in powdered whole blood and when the mixture is aged in an unstirred mass at room temperature, approximately seven days are required for the reaction to reach a plateau in the percentage of water-soluble solids.

In order to describe the invention fully, several illustrative examples are given hereinafter but without in any way limiting the invention thereto.

EXAMPLE I 100 grams of soluble dried blood was placed in a gallon jar, and an open two-ounce bottle half filled with a 37% water solution of formaldehyde was suspended in the jar over the dried blood. The jar was closed and stored at room temperature; and at intervals thereafter, samples of the dried blood product were extracted for the determination of water-solubility.

Soluble solids were determined in the samples by first weighing 5 grams of the blood product into a 250 ml. beaker, adding from 10 to 15 mls. of distilled water and stirring the mixture into a smooth paste. Next, two to three drops of n-octyl alcohol or n-amyl alcohol were added as a deformer. The resultant mixture was allowed to stand one hour with intermittent frequent small additions of water (up to 150 ml. in total) and with sufficient stirring to put the blood product into solution. The contents of the beaker was then carefully washed into a 250 ml. volumetric flask which was then filled with distilled water to the indicated volume. The contents of the flask was mixed thoroughly, and a portion immediately filtered through a fluted filter paper. 25 ml. of the filtrate was then pipetted into a tared aluminum foil dish, and the dish with its contents was placed in an oven at from about 105° to about 110° C. where it was held overnight in order to dry the contents to constant weight. The dish was cooled in a desiccator and weighed, the net weight representing soluble solids which were then calculated to percent soluble solids.

Before initiation of the reaction with formaldehyde vapor, the soluble dried blood presented a soluble content of 82.5% as determined by the described procedure. After two days exposure to the formaldehyde atmosphere, the soluble solids of the blood product had been reduced to 50.6%; and after twelve days, the soluble solids content was 5.2%. In addition, treatment of a sample of the two-day reaction product with a 0.5% solution of sodium hydroxide showed visible swelling of the individual particles when the same were examined under the microscope, thus indicating alkali responsiveness of the product.

This alkali responsiveness indicated suitability of the product for formulation into an alkali-based adhesive.

EXAMPLE II–VIII

Five-gallon cans were equipped with three baffles each, and 3500 grams of powdered whole blood was introduced into each of seven such cans, filling each can about half full. Before the cans were closed, ten ¾-inch procelain balls and selected amounts of paraformaldehyde were added to each. The selected amounts of paraformaldehyde were, by weight, 0.10%, 0.25%, 0.40%, 0.50%, 0.60%, 0.75% and 1.0%. The closed cans were power-rolled for about one hour to mix the contents. Subsequently, the cans were stored at room temperature. Immediately after mixing and at various intervals thereafter, a sample was extracted from each of the cans for determnination of water solubility. The resultant data is presented graphically in FIG. 1.

It will be recognized from an examination of FIG. 1 that the products derived from incorporation of 0.40% to 1.0% paraformaldehyde eventually reached one of the desired target ranges of percent soluble solids, i.e. from about 5% to about 25% soluble solids. Moreover, this particular desired target range was reached, in all cases except the sample containing 0.4% paraformaldehyde, in seven days expired time or less.

All but the 0.10% paraformaldehyde product were formulated into adhesives of the type useful in plywood manufacture and very viscous, soft mush-like glues resulted. Specifically, 88 grams of each proteinaceous reaction product was mixed with 350 grams of cold tap water and 3 grams of pine oil as a defoamer. Blending was achieved using a Hobart mixer that was operated for three minutes. 270 grams of water was then poured into the running mixer followed by 18 grams of sodium hydroxide solution containing 0.5 gram of sodium hydroxide per ml. This was promptly followed with a slurry of 9 grams of calcium hydroxide in 30 grams of water. This latter slurry of calcium hydroxide was rinsed into the contents of the Hobart mixer with 50 grams of cold tap water. The mixer was then operated for an additional six minutes, whereupon 40 grams of sodium silicate (grade K) was added and followed by four minutes additional mixing. Viscosities of the various adhesive products were determined by extracting a 450 ml. sample from the mixer. The sample was allowed to stand for five minutes in a 600 ml. beaker, and then the sample was stirred manually with a spatula directed through 30 revolutions. The viscosity was determined using a Brookfield viscosimeter, the reading being taken on the appropriate spindle at the fourth revolution. Additional viscosity determinations were made by repeating the reading procedure at thirty and at sixty minute intervals after conclusion of the mixing.

Fresh samples of adhesive were made from the several proteinaceous reaction products as the latter aged, and the viscosities of these various batches of adhesive are shown graphically in FIG. 2. Adhesives suitable for one particular application and having a viscosity of from about 9,000 to about 18,000 centipoises are considered desirable; and therefore, the information presented in FIG. 1 indicates that the products made by incorporating 0.4%, 0.5%, 0.6% and 0.75% paraformaldehyde result in highly useful adhesives. In addition, these latter products were smooth in consistency. By comparison, corresponding adhesives fomulated from soluble dried blood gave a thin, lumpy liquid having a viscosity of less than 500 centipoises, and insoluble blood (fertilizer blood) produced adhesive having a viscosity of below 1,500 centipoises.

EXAMPLE IX 200 grams of powdered casein was introduced into a gallon jar, and one gram of paraformaldehyde crystals was manually mixed with the powdered casein. The mixture was stored at room temperature. Adhesive products were made from the aged mixture in compliance with the formulation outlined in Example II–VIII, and viscosities were determined for these different adhesive products. The viscosity data is collected in Table I below.

TABLE I

| Days after paraformaldehyde addition: | Viscosity (centipoises) one hour after adhesive preparation |
| --- | --- |
| 0 | 1,400 |
| 1 | 44,000 |
| 2 | 134,000 |
| 6 | 34,000 |
| 14 | 35,000 |

The foregoing viscosity data indicates that, while the viscosity value of the adhesive showed an ultimate decline from the peak value, a substantial plateau was reached upon storage of the casein-paraformaldehyde mixture, a plateau which presented an appreciable improvement over adhesive made from the freshly blended and unreacted product.

EXAMPLE X 200 grams of substantially oil-free powdered isolated soybean protein was mixed in a one gallon container with one gram of paraformaldehyde crystals; and the resultant mixture was stored at room temperature for seven days. In order to determine the suitability of the treated mixture for use as an adhesive component, a ten gram sample of the mixture was added to 50 ml. of a 0.5% solution of sodium hydroxide. The treated particles rapidly swelled to approximately three or four times their initial size while retaining their initial shape and continuity, thus indicating insolubilizaton of the protein with retention of reactivity with alkali and therefore suitability for use in making alkali-based adhesives. By comparison, a sample of the untreated soybean protein dissolved to form a non-descript, jelly-like mass when introduced into a quantity of the 0.5% solution of sodium hydroxide.

EXAMPLE XI

Two lots of powdered whole blood were treated with selected amounts of not more than 0.1% paraformaldehyde.

The procedure for the first lot, hereinafter called lot A, was as follows: a number of 8 pound samples of powdered whole blood at room temperature were placed into a Twin Shell dry blender with selected amounts of paraformaldehyde. The blender was operated for about one hour to mix the contents. At about every 15 minutes during operation, the machine was placed on high speed using the intensifier bar for about 10 seconds to aid thorough mixing. After mixing, the samples were transferred back to the cans and the cans were stored at room temperature for about 1½ months. At that time the water solubility of each of the samples was determined.

The procedure for the second lot, hereinafter referred to as lot B, was as follows: a number of 8 pound samples of powdered whole blood at room temperature were mixed with selected amounts of paraformaldehyde as described above for lot A. After mixing, the temperature of the samples was raised to about 130° F. and maintained there for 4¾ hours. Then the samples were allowed to cool to room temperature and were stored at room temperature for about 1½ months. At that time the water solubility of each of the samples was determined. The resultant solubility data for both lots of blood is set forth in Table II.

TABLE II

| Sample | Solubility analysis (percent) | | |
|---|---|---|---|
| | Moisture | Soluble solids | Total solids |
| Untreated blood lot A | 8.9 | 88.9 | 97.7 |
| Treated with 0.05% paraformaldehyde | 9.2 | 87.2 | 96.4 |
| Treated with 0.10% paraformaldehyde | 9.3 | 84.0 | 92.3 |
| Untreated blood lot B | 4.6 | 78.6 | 83.2 |
| Treated with 0.02% paraformaldehyde | 4.8 | 75.4 | 80.2 |

From Table II it can be observed that treating powdered whole blood with minor amounts of paraformaldehyde as low as 0.02% results in a desirable blood glue base of comparatively lower water solubility.

The blood glue bases obtained in this example were formulated into adhesives of the type useful in plywood manufacture; and very viscous, soft mush-like glues resulted. Specifically, 144 grams of each blood glue base obtained from lot A and lot B were thoroughly mixed with 1000 ml. of tap water at 70° F., 216 grams of soya flour and 5 ml. of pine oil as a defoamer. Thorough mixing was accomplished by initial hand mixing followed by stirring with a Hobart mixer for five minutes. 682 ml. of tapwater at 70° F. was then poured into the running mixer and after one minute of further mixing 75 grams of a calcium hydroxide slurry containing 0.5 gram of calcium hydroxide per ml. of water was added. After three more minutes of mixing 46 cc. of sodium hydroxide solution containing 0.5 gram per cc. of sodium hydroxide was added and four minutes later 140 grams of sodium silicate (grade K) was added, with stirring continued thereafter for an additional four minutes.

Viscosities of these adhesives were determined by placing sufficient aliquots of the adhesives on a Brookfield viscosimeter operated at 20 r.p.m. using spindles number 5 and 6 with the reading taken exactly 30 seconds after the viscosimeter had been started. Viscosity value readings were taken 5 minutes, 30 minutes and 60 minutes after the end of the mixing operation. The viscosity data obtained is set forth in Table III.

TABLE III

| Sample | Days after paraformaldehyde addition | Viscosity (centipoises) at specified intervals after adhesive preparation | | |
|---|---|---|---|---|
| | | 5 min. | 30 min. | 60 min. |
| Untreated blood lot A | | 5,500 | 7,200 | 7,500 |
| | | 5,400 | 6,800 | |
| Treated with 0.1% paraformaldehyde | 15 | 13,300 | 25,200 | 30,100 |
| | 41 | 18,000 | 33,300 | 37,700 |
| | 54 | 23,800 | 38,200 | 41,400 |
| | 106 | 25,600 | 55,000 | 55,500 |
| Treated with 0.05% paraformaldehyde | 41 | 9,400 | 12,200 | 15,000 |
| | 55 | 10,700 | 16,500 | 18,200 |
| | 55 | 11,100 | 16,400 | 18,800 |
| | 60 | 12,200 | 21,200 | 24,200 |
| | 106 | 9,000 | 17,800 | 18,100 |
| Untreated blood lot B | | 8,600 | 13,000 | 16,300 |
| | | 8,300 | 13,400 | 16,000 |
| Treated with 0.05% paraformaldehyde | 3 | 10,100 | 22,500 | 23,500 |
| | 32 | 10,500 | 18,800 | 24,000 |
| Treated with 0.035% paraformaldehyde | 3 | 12,100 | 31,500 | 38,800 |
| | 32 | 11,300 | 20,300 | 26,200 |
| Treated with 0.02% paraformaldehyde | 3 | 10,000 | 20,000 | 26,200 |
| | 32 | 13,600 | 23,200 | 32,000 |

It is apparent that many widely different embodiments of this invention may be made without departing from its spirit and scope; and therefore, it is not intended to be limited except as indicated in the appended claims.

The invention is claimed as follows:

1. A dry proteinaceous substance consisting essentially of the reaction product of formaldehyde vapor and powdered blood.

2. A proteinaceous substance according to claim 1 wherein said vapor is derived from a water solution of formaldehyde.

3. A proteinaceous substance according to claim 1 wherein said vapor is derived from paraformaldehyde crystals.

4. A dry proteinaceous constituent for glue consisting essentially of the reaction product of formaldehyde vapor and powdered blood.

5. The method of making a dry, proteinaceous constituent for glue consisting essentially of the step of exposing, in the dry phase, powdered blood to a formaldehyde atmosphere for a sufficient time to produce a dry product having a water-solubility of from about 5% to about 25%.

6. The method according to claim 5 wherein said powdered blood and said formaldehyde atmosphere are at substantially room temperature.

7. The method according to claim 5 wherein said exposing is caused to take place for a time sufficient to produce a dry product having a water-solubility of from about 6% to about 10%.

8. The method of making a dry, proteinaceous constituent for glue consisting essentially of the step of exposing, in the dry phase, powdered blood to a formaldehyde atmosphere for a sufficient time to produce a dry product having a water-solubility of from about 70% to about 85%.

9. The method of making a dry, proteinaceous substance consisting essentially of the steps of mixing, in the dry phase, powdered blood with a dry, particulate substance evolving formaldehyde vapor; and aging the resulting mixture to produce a dry product of comparatively lower water-solubility.

10. The method according to claim 9 wherein said aging is caused to take place at a temperature range from about 65° F. to 85° F.

11. The method according to claim 9 wherein said substance evolving formaldehyde vapor is a polymer of formaldehyde.

12. The method according to claim 11 wherein said polymer is paraformaldehyde.

13. The method according to claim 12 wherein said paraformaldehyde is initially present in an amount of from about 0.01% to about 1.0% of the weight of said material comprising a simple protein.

14. The method according to claim 12 wherein said paraformaldehyde is initially present in an amount of from about 0.5% to about 0.6% of the weight of said powdered blood, and wherein said mixture is aged at least seven days at a temperature of from about 70° F. to about 80° F. before using, to result in a dried blood having a total water solubility ranging from 7% up to about 25%.

15. The method according to claim 12 wherein said paraformaldehyde is initially present in an amount of from about 0.3% to about 0.4% of the weight of said powdered blood, and wherein said mixture is aged at least seven days at a temperature of from about 70° F. to about 80° F. before using, to result in a dried blood having a total water solubility ranging from 7% up to about 25%.

16. The method according to claim 12 wherein said paraformaldehyde is initially present in an amount of from about 0.01% to about 0.10% of the weight of said powdered blood, and wherein said mixture is aged at least seven days at a temperature of from about 70° F.

to about 80° F. before using, to result in a dried blood having a total water solubility ranging from 70% to 90%.

References Cited
UNITED STATES PATENTS

| | | | |
|---|---|---|---|
| 748,708 | 1/1904 | Dunham | 260—117 |
| 1,962,763 | 6/1934 | Christopher | 106—146 |
| 1,459,541 | 6/1923 | Lindauer | 106—161 |
| 1,976,435 | 10/1934 | Cone et al. | 87—17 |
| 2,197,168 | 4/1940 | Abramowitsch | 106—138 |
| 2,304,431 | 12/1942 | Walker | 260—57 |
| 2,461,070 | 2/1949 | McKinney | 106—146 |

FOREIGN PATENTS

| | | |
|---|---|---|
| 7,712 | 1896 | United Kingdom. |

OTHER REFERENCES

Chem. Abstracts, vol. 50, 1956, 1939i–1940a–b, Iachan et al.

Modern Wood Adhesives, Perry, 1944, pp. 85–90.

Technology of Adhesives, Delmonte, 1947, p. 257 and 266–274.

Encyclopedia of Chemical Technology, 1964, vol. 3, Kirk, pp. 567–574 and 576–8.

Formaldehyde, 1964, vol. III, Walker, 399–403.

WILLIAM SHORT, Primary Examiner

H. SCHAIN, Assistant Examiner

U.S. Cl. X.R.

106—124, 125, 138, 149, 154; 161—230; 260—117, 119, 123, 123.5

PO-1050
(5/69)

UNITED STATES PATENT OFFICE
CERTIFICATE OF CORRECTION

Patent No. 3,515,711     Dated June 2, 1970

Inventor(s) John P. Richards and Peter L. Shanta

It is certified that error appears in the above-identified patent and that said Letters Patent are hereby corrected as shown below:

Column 1, line 18, the terms "a adhesive" should read ---an adhesive---.

Column 3, line 41, the term "methanol" should read ---methanal---.

Column 4, line 49, the term "deformer" should read ---defoamer---.

In Claim 13, last line thereof, the terms reading "material comprising a simple protein" should read ---powdered blood---.

SIGNED AND
SEALED
SEP 29 1970

(SEAL)
Attest:

Edward M. Fletcher, Jr.
Attesting Officer

WILLIAM E. SCHUYLER, JR.
Commissioner of Patents